United States Patent [19]

Kamimura et al.

[11] 4,344,098
[45] Aug. 10, 1982

[54] CASSETTE TAPE PLAYER

[75] Inventors: Teturo Kamimura; Masahiro Komatsubara; Shizuo Ando; Takugi Inanaga, all of Kawagoe, Japan

[73] Assignee: Pioneer Electronic Corporation, Tokyo, Japan

[21] Appl. No.: 151,978

[22] Filed: May 21, 1980

[30] Foreign Application Priority Data

May 22, 1979 [JP] Japan .................. 54-062910
May 22, 1979 [JP] Japan .................. 54-067724[U]

[51] Int. Cl.³ ............................................ G11B 5/008
[52] U.S. Cl. .................................................. 360/96.6
[58] Field of Search ............... 360/96.6, 137, 105, 360/93; 242/198

[56] References Cited

U.S. PATENT DOCUMENTS 3,146,316 8/1964 Knoth.
3,395,871 8/1968 Ackermann et al.
3,635,423 1/1972 Lennie ............................. 360/96.6
3,950,787 4/1976 Hosaka ........................... 360/96.6
4,024,580 5/1977 Ban ................................. 360/96.6
4,072,988 2/1978 Sato ................................ 360/96.6
4,109,286 8/1978 Katsurayama ................... 360/96.6

Primary Examiner—Robert M. Kilgore
Attorney, Agent, or Firm—Armstrong, Nikaido, Marmelstein & Kubovcik

[57] ABSTRACT

A cassette tape player suitable for use in automobile audio systems is provided. A receptacle for a cassette is movably mounted in a chassis at an angle with respect to the chassis bottom. A guide mechanism serves to first translate the receptacle in the oblique position and then turn the receptacle about its trailing edge to place the receptacle in a horizontal position. The guide is designed such that the capstan receiving opening in the cassette in the receptacle is maintained in constant alignment with the capstan during change of the receptacle from the oblique to the horizontal position, avoiding cassette damage and capstan deformation. Electric controls are accommodated in the space between the receptacle and the chassis bottom.

6 Claims, 8 Drawing Figures

CASSETTE TAPE PLAYER

BACKGROUND OF THE INVENTION

This invention relates to improvements in cassette tape players of the slot-in type.

Car audio systems often use cassette tape players of the slot-in type in which a cassette is horizontally inserted into a player housing and then vertically moved into a play position. Such prior art slot-in type cassette loading requires a relatively large space for cassette loading because of the vertical parallel movement of a cassette into the play position.

An attempt was made to insert a cassette at an angle with respect to the player housing. The cassette must be eventually positioned horizontally. During this change of the cassette position, the fixed capstan is inserted into the capstan receiving opening in the cassette. If the capstan receiving opening in the cassette is aligned with the capstan when the cassette is in the oblique position, then the opening will be offset from the capstan when the cassette is turned into the horizontal position. On the contrary, if the capstan receiving opening in the cassette is aligned with the capstan when the cassette is in the horizontal position, then the opening will be offset from the capstan when the cassette is in the oblique position. In either case, the capstan contacts the cassette casing adjacent the capstan receiving opening. As a result, the cassette casing may be damaged or the capstan may be deformed.

SUMMARY OF THE INVENTION

An object of the present invention is to solve this problem of alignment between the capstan and the capstan receiving opening in a cassette during change of the cassette from an oblique position to a horizontal position.

A cassette tape player according to the present invention comprises a box-like receptacle movably mounted in a chassis for receiving a cassette therein. The receptacle is at an angle with respect to the chassis bottom. There is provided guide means for first translating the receptacle in the oblique position, and then turning the receptacle approximately about its trailing edge to place the receptacle in a position parallel to the chassis bottom.

According to one aspect of the present invention, a provision is made for maintaining the capstan receiving opening in a cassette in constant alignment with the capstan independent of whether the cassette is in an oblique or horizontal position.

Another disadvantage associated with the prior art slot-in type cassette tape player is that a relatively large space is required for cassette loading because of vertical movement of a cassette. A front panel having a power switch, a volume control unit, a pilot lamp, etc. incorporated therein must be separately attached to the front face of the chassis. According to the present invention, the cassette receptacle is translated in the oblique position and then turned approximately about its trailing edge. A space between the trailing edge of the cassette receptacle and the chassis bottom surface remains unoccupied. Electric controls and indicators can be accommodated in this space. A front panel having such electric controls incorporated can be directly attached to the front face of the chassis, ensuring the compactness of the entire player.

DESCRIPTION OF THE PREFERRED EMBODIMENT

Figure 1:
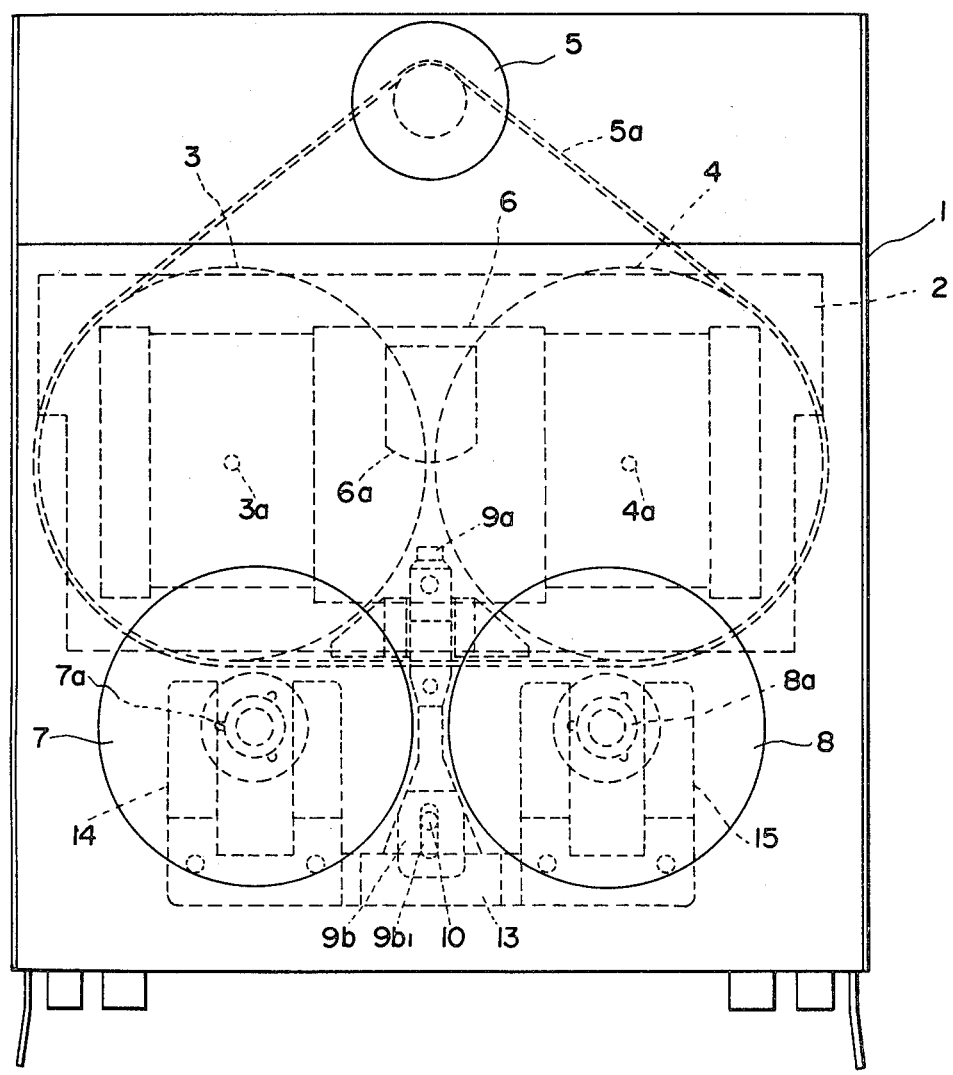
FIG. 1 is a plan view of a cassette tape player according to this invention.

Referring to FIG. 1, the cassette tape player of the present invention comprises a rectangular box-like chassis 1 including upper and lower main walls which are assumed to be horizontal for convenience of description. To the chassis upper wall is secured an attachment plate 2 which has shafts $3a$ and $4a$ journalled therein. The shafts $3a$ and $4a$ project from flywheels 3 and 4 and form capstans. A motor 5 is fixedly mounted on the chassis 1 and a belt $5a$ is threaded around a pulley on a drive shaft of the motor 5 and the flywheels 3 and 4. Numeral 6 is a head carriage on which a reproducing head $6a$ is fixedly mounted. The head carriage 6 is adapted to move forward (downwards in FIG. 1) such that the head $6a$ is inserted into the head opening in the cassette casing when a cassette is loaded in place. Motors 7 and 8 are mounted on the upper wall of the box-like chassis 1 and have reel shafts $7a$ and $8a$ extending vertically downward.

Figure 2:
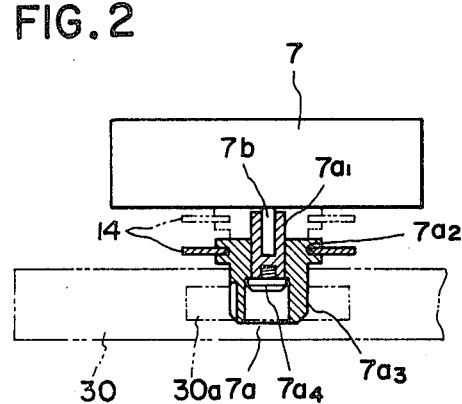
FIG. 2 is a cross section of a movable reel shaft.

FIG. 2 illustrates the construction of the motor 7 and the reel shaft $7a$. The reel shaft $7a$ includes a rectangular box $7a_1$ rigidly secured to a rotating shaft $7b$ projecting from the motor 7, a reel shaft body $7a_3$ mounted for sliding motion over the boss $7a_1$ and having an annular recess $7a_2$ on the circumference, and a retaining screw $7a_4$ threaded into the end of the boss $7a_1$ to prevent the reel shaft body $7a_3$ from dropping out of the boss $7a_1$. Accordingly, the reel shaft $7a$ has an axial sliding movement, but is restrained from circumferential rotation in relation to the boss $7a_1$. It will be understood that the reel shaft $8a$ has the same construction as the reel shaft $7a$.

Figure 3:
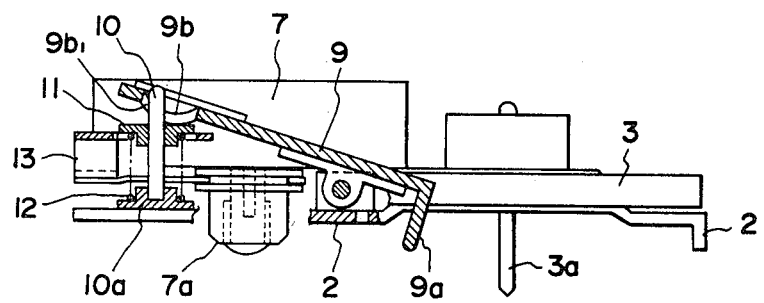
FIG. 3 illustrates the reel shaft and associated parts prior to cassette loading.
Figure 4:
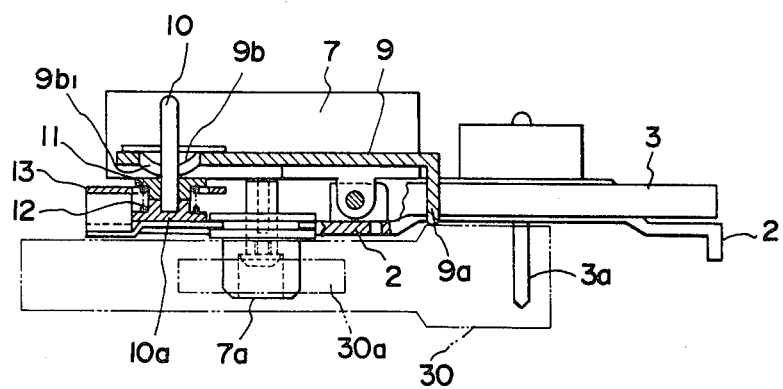
FIG. 4 illustrates the reel shaft and associated parts after cassette loading.

Numeral 9 designates a control plate pivotally mounted to the attachment plate 2 at the center and having a downward projecting tab $9a$ at one end as shown in FIGS. 3 and 4. Upon cassette loading, this tab $9a$ is urged upward by a cassette so that the control plate 9 is displaced into a horizontal or parallel position to the main walls. The other end of the control plate 9 is formed into a bent portion $9b$ having a slot $9b_1$ therein. A guide pin 10 is embedded at right angles in a boss $10a$ which is secured to the attachment plate 2. The upper end of the pin 10 extends through a bushing 11 and the slot $9b_1$ in the bent portion $9b$ of the control plate 9. The bent portion $9b$ abuts the upper surface of bushing 11. The bushing 11 is supported by a spring 12 which is disposed between the bushing 11 and the boss $10a$. The bushing 11 fits in an opening in a lever 13 and is rigidly secured to the lever. The lever 13 is thus horizontally held by means of the pin 10, boss $10a$, bushing 11 and spring 12. The lateral ends of the lever 13 extend to positions in register with the reel shafts 7a and 8a when projected. A U-shaped leaf spring 14 is secured to the lever end so that a pair of arms of the U spring 14 engage in the reel shaft recess $7a_2$. The same construction applies to a leaf spring 15 and the reel shaft 8a.

Figure 5:
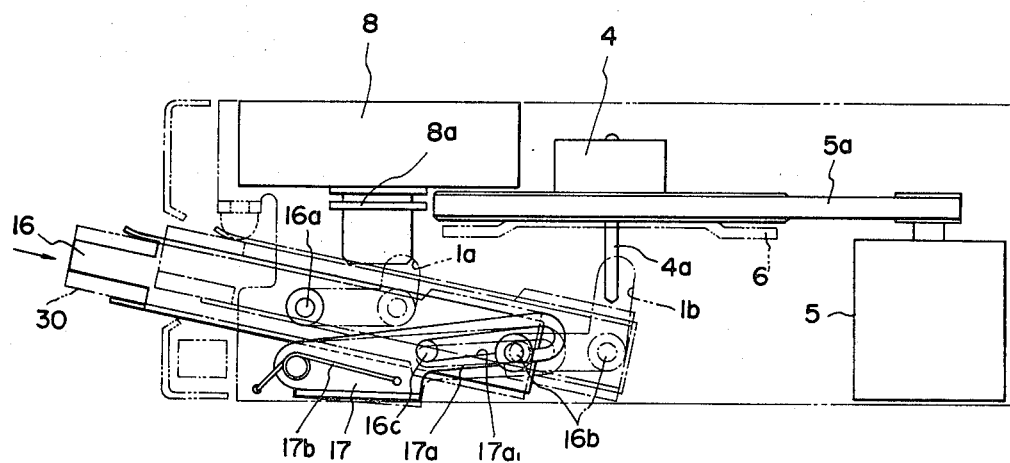
FIG. 5 illustrates a cassette receptacle and guide means prior to cassette loading.
Figure 6:
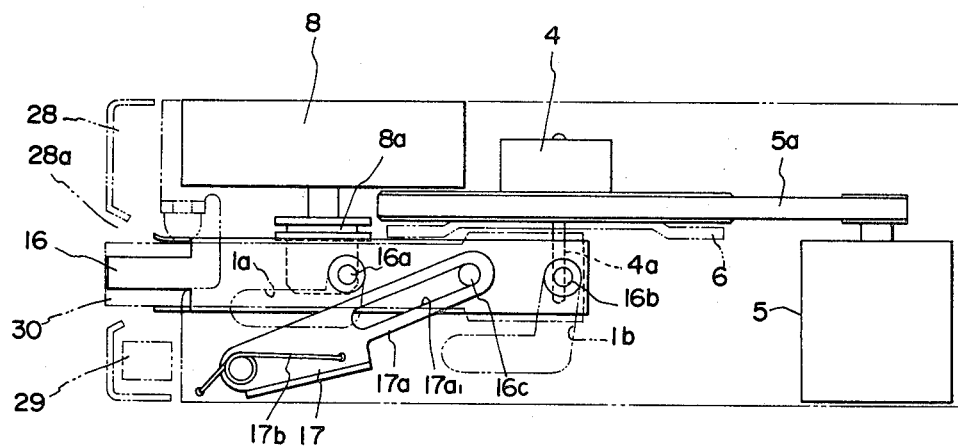
FIG. 6 illustrates the receptacle and guide means after cassette loading.

In side elevations of FIGS. 5 and 6, numeral 16 designates a receptacle in which a cassette 30 is inserted and held in place. The cassette receptacle 16 is provided at either side wall with three pairs of guide rollers 16a, 16b and 16c. The guide rollers 16a and 16b engage in L-shaped guide grooves 1a and 1b in either side wall of the chassis 1, while the remaining pair of guide rollers 16c engage in guide grooves $17a_1$ in biasing members 17 which will be discussed hereinafter. The guide rollers and grooves are positioned such that the cassette receptacle 16 is normally set at an angle with respect to the lower wall of the chassis 1. When the cassette 30 is manually pushed in the direction shown by the arrow in FIG. 5, the cassette receptacle 16 is initially translated in the oblique position along the horizontal portions of the respective guide grooves 16a and 16b and then turned into the horizontal position along the vertical portions of the guide grooves 1a and 1b. The biasing member 17 is pivotally mounted at one end to the side wall of the chassis 1 and biased by a spring 17b in a direction for turning the cassette receptacle 16 into a horizontal position or a counterclockwise direction when viewed in FIGS. 5 and 6. The biasing member 17 has an extension 17a formed with the guide groove $17a_1$.

It should be noted that the cassette receptacle 16 is biased by a spring (not shown) toward the initial position or to the left when viewed in FIGS. 5 and 6. Further, the vertical portions of the L-shaped guide grooves 1a and 1b are at an angle slightly larger than 90° with respect to their horizontal portions.

Further referring to FIGS. 5 and 6, over the chassis 1 is mounted a front panel 28 having an aperture 28a for allowing insertion of a cassette. Controls 29 including a switch, a volume control, pilot lamps and the like are mounted within the front panel 28 below the cassette insertion aperture 28a. Attachment of electric controls below the aperture 28a will not disturb cassette loading because the space below the trailing edge of the receptacle 16 is not occupied by the receptacle 16 which is translated without changing its oblique position.

With the above-described arrangement, a cassette may be loaded in place as follows.

First, the cassette 30 is inserted into the cassette receptacle 16 through the front aperture 28a. It will be understood that the windowed face of the cassette should be the leading edge in this case. The cassette 30 is manually pushed at its trailing edge to the right, then the receptacle 16 is translated in the oblique position because the guide rollers 16a, 16b and 16c are guided along the horizontal portions of the chassis guide grooves 1a and 1b and the guide grooves 17a of the biasing member 17.

Prior to cassette insertion the control plate 9 is in the slant position as shown in FIG. 3. The spring 12 urges upward the bushing 11 and hence, the lever 13. Then the U-shaped leaf springs 14 and 15 which are rigidly connected to the lever 13 are maintained at the upper position as shown by the dot-and-dash lines in FIG. 2 and holds the reel shafts 7a and 8a in the upper position. Consequently, the reel shafts 7a and 8a are held retracted from the path of the receptacle 16 so that they do not interfere with the receptacle 16 when the receptacle is translated.

After the guide rollers 16a and 16b on the receptacle 16 come to the ends of the horizontal portions of the guide grooves 1a and 1b, the guide rollers 16a and 16b are displaced upward along the vertical portions of the guide grooves 1a and 1b because the receptacle 16 is always urged upward by the biasing force of the spring 17b through the member 17. The receptacle 16 is gradually pivoted about its trailing edge to the horizontal position. The members are designed such that the capstans 3a and 4a are in alignment with the capstan receiving openings in the cassette 30 when the receptacle 16 comes to the end of its translation. With this arrangement, the capstans 3a and 4a do not contact the cassette 30 when the receptacle 16 containing the cassette 30 therein is pivoting. Since the vertical portions of the guide grooves 1a and 1b are at an angle slightly larger than 90° with respect to the horizontal portions, the receptacle 16 is also advanced laterally a small distance when pivoted from the oblique position to the horizontal position. Defferently stated, the receptacle 16 is pivoted about a slightly shifting pivot. This ensures the alignment of the capstans 3a and 4a with the capstan receiving openings in the cassette during pivoting of the receptacle 16 and after the receptacle 16 has been pivoted to the horizontal position.

When the receptacle 16 with the cassette 30 is turned to the horizontal position, the projecting tab 9a of the control plate 9 is raised by the cassette 30. The control plate 9 is rotated counterclockwise from the position of FIG. 3 to the position of FIG. 4 against the action of the spring 12. The control plate bent portion 9b presses downward the bushing 11 and the lever 13 secured thereto. Together with the lever 13, the U-shaped leaf springs 14 and 15 are moved into the lower position shown by the solid lines in FIGS. 2 and 4, and serve to resiliently move down the reel shafts 7a, 8a into opening of cassette reel hubs 30a. Since the reel shafts 7a and 8a are brought into contact with the cassette reel hubs 30a in a resilient fashion, the reel hubs are not damaged by the contact with the reel shafts. In this manner, the capstans 3a, 4a and the reel shafts 7a, 8a are correctly mated in the cassette when the cassette is set at the horizontal position. At this point, the head carriage 6 moves such that the head 6a is inserted into the corresponding window in the cassette 30. A selected one of two pinch rollers (not shown) is brought into pressure contact with the corresponding capstan 3a or 4a and a selected one of the motors 7 and 8 is energized, initiating playback operation.

Next, the ejecting operation is described. An eject lever is mounted on the chassis and operatively connected to the associated members, but not shown in the drawings for simplicity. When the eject lever is operated, the head carriage 6 and the pinch roller are retracted and then the cassette receptacle 16 is turned clockwise in FIGS. 5 and 6. This eject lever is designed to exert sufficient force to lower the receptacle leading edge such that the guide rollers 16a, 16b reach the intersection between the vertical and the horizontal portions of the guide grooves 1a, 1b. When the guide rollers 16a, 16b have moved along the vertical groove portions to the intersection, the receptacle 16 is then returned to the initial position because it is always biased by the spring (not shown). The receptacle 16 resumes its initial position ready for removal of the cassette 30.

The ejecting operation may be carried out in a two-step manner.

A one step operation of the eject lever causes only the head carriage 6 and the pinch roller to be retracted, providing a stop action. A second step operation of the eject lever causes the cassette receptacle 16 to be returned to the initial position, providing an eject operation. An eject lever and a stop lever may be separately provided for these purposes.

Figure 7:
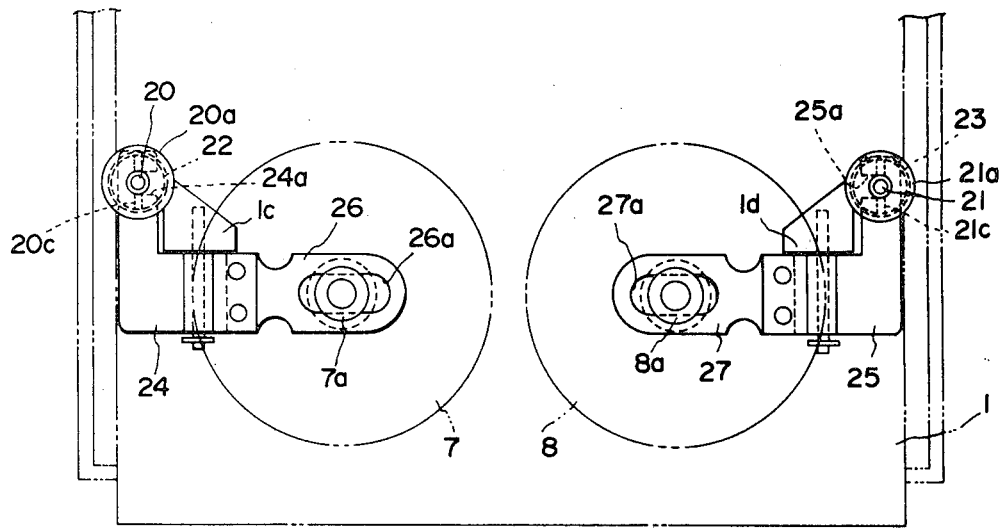
FIGS. 7 and 8 are plan view and side elevation of reel shaft controlling means according to another embodiment of this invention.
Figure 8:
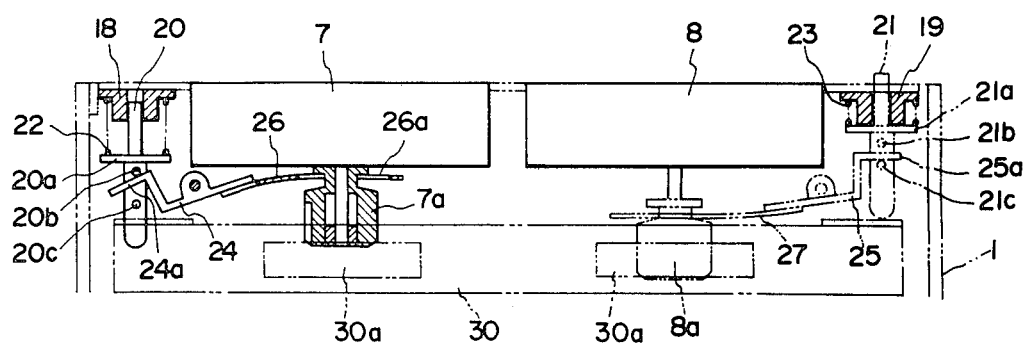

FIGS. 7 and 8 illustrate another embodiment for control controlling the vertical movement of the reel shafts 7a and 8a.

To the upper wall of the chassis 1 is secured a bearing 18 (19) in which a rod 20 (21) is journalled for vertical motion. At the intermediate of the rod there is provided a flange 20a (21a) which coasts with a spring 22 (23) seated on the bearing 18 (19), thereby biasing the rod downward. Below the flange 20a (21a), the rod 20 (21) is provided a with a pair of spaced apart pins 20b, 20c (21b, 21c) projecting perpendicular to the rod axis. A portion of the chassis is cut and bent to form a standing bracket 1c (1d) to which a control plate 24 (25) is pivoted. A forked end 24a (25a) of the control plate 24 (25) engages with the rod 20 (21) between the pins 20b and 20c (21b and 21c). To the other end of the control plate 24 (25) is rigidly secured a leaf spring 26 (27) having a guide slot 26a (27a) formed therein. The inner periphery of the leaf spring 26 (27) defining the slot 26a (27a) is engaged in the recess $7a_2$ in the reel shafts 7a (8a). In this case, the reel shaft body $7a_3$ is composed of two segments which are separated at a position of the recess $7a_2$ and integrally bonded after assembly.

The operation of the other embodiment is now described. The situation prior to cassette loading is illustrated at the left side in FIG. 8. The rod 20 is biased to the lower position by the spring 22 and the forked end 24a of the control lever 24 is pressed downward by means of the pin 20b. That is, the control lever 24 is rotated counterclockwise. As a result, the leaf spring 26 holds the reel shaft 7a to the upper position nearest to the motor 7.

The situation after cassette loading is illustrated at the right side in FIG. 8. The cassette 30 which is loaded in the above-mentioned manner and positioned to the position shown by the dot-and-dash lines abuts the rod 21 at the bottom. The rod 21 is moved upward against the action of the spring 23. The forked end 25a of the control lever 25 is pressed upward by means of the pin 21c. That is, the control lever 25 is rotated counterclockwise in FIG. 8 (the control lever 24 is rotated clockwise). As a result, the leaf spring 27 gradually and resiliently presses down the reel shaft 8a away from the motor 8. The reel shaft 8a is inserted into the opening of the reel hub 30a in the cassette 30.

As described in the foregoing, in a cassette tape player of the type wherein a cassette is inserted in an oblique position and eventually turned to a horizontal position, a provision is made such that the capstan receiving opening in the cassette is kept in constant alignment with the capstan during change of the cassette position from the oblique to the horizontal (including when the cassette has reached the end of its translation in the oblique position and when the cassette is in the horizontal position). This ensures that the capstan does not contact the cassette casing, avoiding cassette damage and capstan deformation.

Further, a space remaining unoccupied between the cassette receptacle and the chassis bottom is effectively utilized to accommodate electric controls and indicators such as a power switch, a volume control unit, a tone control unit, a pilot lamp, etc. The cassette loading system and the electric controls are incorporated within a single chassis, eliminating the need for extra space for electric control attachment as well as contributing to compactness of the entire player.

What is claimed is:

1. A cassette tape player comprising
a chassis having upper and bottom surfaces,
a capstan extending downward from the upper surface of the chassis,
a box-like receptacle for receiving a cassette therein, movably mounted in the chassis at an oblique position with respect to the chassis bottom, the trailing edge of said receptacle being more remote from the chassis bottom than the leading edge, and
guide means for first translating the receptacle in the oblique position, and then turning the receptacle approximately about its trailing edge to place the receptacle in a position parallel to the chassis bottom, said guide means including, at least one pair of guide grooves each formed in the chassis and consisting of a first portion extending parallel to the chassis bottom and a second portion following the first portion and forming an angle slightly larger than 90° with the first portion, and at least one pair of guide members mounted on either side of said cassette receptacle and mated with said pair of guide grooves, wherein when said guide member reaches the intersection between the first and second portions of said guide grooves, the cassette in the receptacle is positioned with its capstan receiving opening aligned with the capstan, and when said guide member is advanced along the second portion to pivot the cassette receptacle from the oblique position to the parallel position, the capstan receiving opening of the cassette is maintained in alignment with said capstan,
said guide means being such that the capstan receiving opening in the cassette in said receptacle is maintained in constant alignment with said capstan during turning of the receptacle from the oblique position to the parallel position.

2. A cassette tape player according to claim 1 wherein said guide means further includes
a pair of guide tracks each formed in a spring-biased member pivoted to the chassis bottom, and
a pair of guide rollers pivoted on either side of said cassette receptacle and mated with said pair of guide tracks,
whereby said spring-biased member urges said guide roller toward the chassis upper surface to turn the cassette receptacle to the parallel position after said guide member has reached said intersection.

3. A cassette tape player according to claim 2 which further comprises
means for spring biasing said cassette receptacle to an initial position.

4. A cassette tape player according to claim 3 which further includes an eject lever capable of exerting sufficient force to overcome the biasing force of said spring-biased member to turn the cassette receptacle from the parallel position to the oblique position, thereby allowing the the cassette receptacle to be returned to the initial position by said spring biasing means.

5. A cassette tape player according to claim 1 which further comprises electric controls and indicators disposed between the trailing edge of said cassette receptacle and the bottom surface of said chassis.

6. A cassette tape player according to claim 5 wherein said electric controls and indicators include a power switch, a volume control and a pilot lamp.

* * * * *